US012006946B2

(12) United States Patent
De Raeve et al.

(10) Patent No.: US 12,006,946 B2
(45) Date of Patent: Jun. 11, 2024

(54) PROCESS FLUID LUBRICATED PUMP AND PUMPING SYSTEM

(71) Applicant: Sulzer Management AG, Winterthur (CH)

(72) Inventors: Karel De Raeve, Winterthur (CH); Thomas Welschinger, Radolfzell (DE)

(73) Assignee: SULZER MANAGEMENT AG, Winterthur (CH)

( * ) Notice: Subject to any disclaimer, the term of this patent is extended or adjusted under 35 U.S.C. 154(b) by 189 days.

(21) Appl. No.: 17/454,072

(22) Filed: Nov. 9, 2021

(65) Prior Publication Data
US 2022/0178381 A1   Jun. 9, 2022

(30) Foreign Application Priority Data

Dec. 8, 2020  (EP) .................................... 20212543

(51) Int. Cl.
*F04D 29/06* (2006.01)
*F04D 1/08* (2006.01)
(Continued)

(52) U.S. Cl.
CPC ............. *F04D 29/061* (2013.01); *F04D 1/08* (2013.01); *F04D 13/086* (2013.01);
(Continued)

(58) Field of Classification Search
CPC ........ F04D 1/06; F04D 13/086; F04D 29/086; F04D 29/106; F04D 29/126;
(Continued)

(56) References Cited

U.S. PATENT DOCUMENTS 5,827,042 A * 10/1998 Ramsay ................ F16C 17/105
  415/231
6,210,103 B1 * 4/2001 Ramsay .............. F04D 29/0413
  415/230
(Continued)

FOREIGN PATENT DOCUMENTS

DE  933 849 C   10/1955
EP  3 739 215 A1  11/2020

OTHER PUBLICATIONS

Extended European Search Report issued May 4, 2021 in European Patent Application No. EP20212543.1, filed Dec. 8, 2020.

*Primary Examiner* — Courtney D Heinle
*Assistant Examiner* — Andrew J Marien
(74) *Attorney, Agent, or Firm* — GLOBAL IP COUNSELORS, LLP

(57) ABSTRACT

A process fluid lubricated pump includes a housing with an inlet to receive the fluid, and an outlet to discharge the fluid, a shaft extending from a drive end to a non-drive end and rotatable about an axial direction, the drive end of the shaft arranged outside the housing, a hydraulic unit including impellers mounted on the shaft, a collection chamber to collect leaking process fluid, the collection chamber comprising an exit, through which the shaft passes, and an exit to discharge the process fluid, and a throttle device arranged between the hydraulic unit and the collection chamber, the throttle device comprising a stationary throttle part having first and second axial faces delimiting the stationary throttle part, the first axial face facing the collection chamber, and the throttle device including a throttle gap surrounding the shaft and extending from the first axial face to the second axial face.

15 Claims, 5 Drawing Sheets

(51) Int. Cl.
*F04D 13/08* (2006.01)
*F04D 29/041* (2006.01)
*F04D 29/047* (2006.01)
*F16C 17/02* (2006.01)
*F16C 17/08* (2006.01)
*F16C 17/14* (2006.01)

(52) U.S. Cl.
CPC ..... *F04D 29/0413* (2013.01); *F04D 29/0416* (2013.01); *F04D 29/0473* (2013.01); *F16C 17/02* (2013.01); *F16C 17/08* (2013.01); *F16C 17/14* (2013.01)

(58) Field of Classification Search
CPC .............. F04D 29/146; F04D 29/0413; F04D 29/0416; F04D 29/041; F04D 29/061; F05D 2260/6022
See application file for complete search history.

(56) References Cited

U.S. PATENT DOCUMENTS

| | | | |
|---|---|---|---|
| 6,695,480 | B1* | 2/2004 | Ramsay ............... F04D 29/047 384/112 |
| 2005/0254943 | A1* | 11/2005 | Fukuchi ............... F04D 29/041 415/206 |
| 2007/0292283 | A1 | 12/2007 | Oklejas |
| 2013/0315730 | A1* | 11/2013 | Meuter ............... F04D 29/0473 415/229 |
| 2017/0022997 | A1* | 1/2017 | Felix .................... F04D 29/041 |
| 2017/0122324 | A1* | 5/2017 | Meuter ............... F04D 29/5806 |
| 2017/0306966 | A1* | 10/2017 | Valland ................ F04D 29/041 |
| 2019/0072096 | A1* | 3/2019 | Mei ...................... F04D 13/086 |
| 2021/0088056 | A1* | 3/2021 | Radcliffe ............. F04D 29/126 |
| 2021/0156392 | A1* | 5/2021 | Van-De-Velde ...... F04D 29/128 |

* cited by examiner

PROCESS FLUID LUBRICATED PUMP AND PUMPING SYSTEM

CROSS-REFERENCE TO RELATED APPLICATION

This application claims priority to European Patent Application No. 20212543.1, filed Dec. 8, 2020, the contents of which are hereby incorporated by reference in their entirety.

BACKGROUND

Field of the Invention

The invention relates to a process fluid lubricated pump for conveying a process fluid. Furthermore, the invention relates to a pump system comprising such a process lubricated pump.

Background Information

Conventional process fluid lubricated pumps for conveying a process fluid are used in many different industries. An important example is the oil and gas processing industry, where process fluid lubricated pumps are designed e.g. as multiphase pumps for conveying hydrocarbon fluids, for example for extracting the crude oil from the oil field or for transportation of the oil/gas through pipelines or within refineries. Another important application of process fluid lubricated pumps in the oil and gas industry is the injection of a process fluid, in most cases water and in particular seawater, into an oil reservoir. For such applications, the pumps are designed as water injection pumps supplying seawater or pretreated seawater at high pressure to a well that leads to a subterranean region of an oil reservoir. A typical value for the pressure increase generated by such a water injection pump is 200-300 bar (20-30 MPa) or even more.

Water injection into oil reservoirs is a well-known method for increasing the recovery of hydrocarbons from an oil or gas field. The injected water maintains or increases the pressure in the reservoir thereby driving the oil or the hydrocarbons towards and out of the production well.

In some applications, raw seawater is injected into the oil reservoir. However, in many applications the seawater is pretreated to avoid negative impacts on the oil reservoir, such as acidifying the oil, e.g. by hydrogen sulfide ($H_2S$), or blocking pores or small passages in the reservoir, e.g. by means of sulfates. To achieve the desired seawater quality, the seawater is passed through a series of ever-finer filters providing a microfiltration of the seawater. In addition, biological or electrochemical processes can be used to pretreat the seawater. Usually the final step of the filtration is a nanofiltration, in particular to remove the sulfates from the seawater. Nanofiltration is a membrane filtration process requiring to supply the water to the membrane unit with a pressure of typically 25-50 bar (2.5-5.0 MPa). Particularly for reverse osmosis filtration the required pressure can even be higher. After the nanofiltration process the seawater is supplied to the water injection pump, pressurized and injected into the subterranean region, where the oil reservoir is located.

SUMMARY

In view of an efficient exploitation of oil and gas fields, there is nowadays an increasing demand for pumps and in particular water injection pumps which are deployed at remote locations, which are quite often only laboriously approachable. This might be a subsea location, when the pump is installed directly on the sea ground in particular down to a depth of 500 m, down to 1000 m or even down to more than 2000 m beneath the water surface, but also a topside location on or above the water surface. For example, the pump can be arranged ashore or on an oil platform, in particular on an unmanned platform, or one a FPSO (Floating Production Storage and Offloading Unit). Needless to say that the design of such pumps for deployment at remote locations is challenging, in particular because these pumps operate for a long time period with as little as possible failure, maintenance and service work. Thus, a large mean time between maintenance (MTBM) is highly desired for these pumps. This requires specific measures to minimize the amount of equipment involved and to optimize the reliability of the pump.

In particular, in view of water injection pumps deployed on a platform or on a FPSO it is also desirable to minimize the food print and the required space for the deployment of the pump. In addition, a high efficiency of the pump is strived for, whereas the operating costs shall be as low as possible.

Large efforts are made to optimize such pumps for deployment at remote locations regarding robustness, weight, length, efficiency and susceptibility to damage. Furthermore, the complexity of the pump should be minimized without jeopardizing the operational safety and the reliability of the pump.

It is therefore an object of embodiments of the invention to propose an improved or an alternative process fluid lubricated pump that is in particular suited for topside applications and for deployment at remote locations such as offshore platforms or FPSOs. The pump shall have a low complexity with regard to the equipment, low wear and a high reliability in operation. In particular, the pump should be suited to be configured as a water injection pump for injecting seawater or water e.g. in a subterranean region. Furthermore, it is an objective of embodiments of the invention to propose a pump system comprising such a pump.

The subject matter of the invention satisfying these objects is characterized by the features described herein.

Thus, according to embodiments of the invention, a process fluid lubricated pump for conveying a process fluid is proposed, comprising a pump housing with an inlet for receiving the process fluid having a suction pressure, and an outlet for discharging the process fluid having a discharge pressure, a pump shaft extending from a drive end to a non-drive end of the pump shaft and configured for rotating about an axial direction, wherein the drive end of the pump shaft is arranged outside the pump housing, the pump further comprising a hydraulic unit with a plurality of impellers fixedly mounted on the pump shaft, a collection chamber for collecting leaking process fluid, wherein the collection chamber comprises a shaft exit, through which the pump shaft passes from the inside to the outside of the pump housing, and a fluid exit for discharging the process fluid from the collection chamber, wherein the pump is designed as a seal-less pump without a mechanical seal, wherein a throttle device is arranged with respect to the axial direction between the hydraulic unit and the collection chamber, wherein the throttle device comprises a stationary throttle part having a first axial face and a second axial face delimiting the stationary throttle part with respect to the axial direction, wherein the first axial face faces the collection chamber, and wherein the throttle device comprises a throttle gap surrounding the pump shaft and extending from the first axial face to the second axial face for allowing a leakage of the process fluid along the pump shaft into the collection chamber.

According to a first aspect the pump according to the invention is designed as a process fluid lubricated pump. The term "process fluid lubricated pump" refers to pumps, where the process fluid that is conveyed by the pump is used for the lubrication and the cooling of components of the pump, in particular the bearings. A process fluid lubricated pump does not require a specific lubrication system with a lubricant different from the process fluid for the lubrication of the bearings for supporting the pump shaft. A typical lubrification system comprises the following components: a lubrification fluid reservoir, lubrification fluid filters, a lubrification fluid circulation pump, a lubrification fluid cooler to remove the heat which is generated by the bearings.

Since the pump according to embodiments of the invention does not require a separate lubrication system with a lubricant different from the process fluid, the pump is less complex, less expensive and requires less space. In addition, there is no requirement to supply the pump with a specific lubricant different from the process fluid, which also reduces the investment cost, operational costs and the required service and maintenance work.

According to a further aspect the pump according to the invention has the pump shaft with the drive end located outside of the pump housing. Thus, the pump does not require a drive unit which is arranged within the pump housing or a common housing but can be easily coupled to any drive unit, which is located outside the pump housing. As compared to pumps having the drive unit arranged within the pump housing or a common housing for the pump and the drive unit, the configuration of the pump shaft with the drive end outside the pump housing provides a considerably greater flexibility regarding the drive unit for rotating the pump shaft. The drive unit as a separate unit can be optimized with respect to efficiency, therewith also optimizing the efficiency of the pump.

According to still a further aspect, the pump according to the invention is designed as a seal-less pump without a mechanical seal. A mechanical seal is usually used for the sealing of the rotating shaft of a pump and shall prevent the leakage of the process fluid along the pump shaft of the pump, e.g. into the drive unit or into the environment. Typically, a mechanical seal comprises a stator and a rotor. The rotor is connected in a torque-proof manner with the pump shaft of the pump and the stator is fixed with respect to the pump housing such that the stator is secured against rotation. During rotation of the pump shaft the rotor is in sliding contact with the stator thus performing the sealing action. Usually, the mechanical seal is supplied with a barrier fluid, which is also referred to as seal fluid, or sealing fluid or buffer fluid. The barrier fluid provides for a lubrication between the rotor and the stator and forms a liquid film for avoiding a direct physical contact of the rotor and the stator. In addition, the barrier fluid prevents a leakage of the process fluid through the mechanical seal. Therefore, the barrier fluid is supplied to the mechanical seal with a pressure which is larger than the pressure of the process fluid on the process fluid side of the mechanical seal. By this measure a controlled leakage of the barrier fluid through the mechanical seal to the process fluid side is achieved which prevents the process fluid from leaking through the mechanical seal. Although such mechanical seals are widely spread within the technology of rotary pumps they are somewhat problematic because they are quite complicated and susceptible to failures. Furthermore, mechanical seals require additional support equipment, such as a barrier fluid system, a pressure retaining unit, an accumulator for the barrier fluid, a reservoir for the barrier fluid, a pumping device for circulating the barrier fluid. Therefore, the design of the pump as a seal-less pump, i.e. a pump that has no mechanical seal considerably reduces the complexity of the pump system.

Furthermore, due to the seal-less design the entire support equipment for the barrier fluid system including the barrier fluid itself is no longer required. This reduces the installation costs, the operating cost, the footprint and the required space of the pump system, as well as the required service and maintenance work.

Instead of a mechanical seal the simple throttle device is used for a sealing between the hydraulic unit and the collection chamber, which comprises the shaft exit through which the pump shaft passes to the outside of the pump housing. In the collection chamber a pressure prevails which equals essentially the ambient pressure outside of the pump housing. Due to the fluid exit disposed at the collection chamber, the process fluid can be discharged from the collection chamber and recycled e.g. to a process fluid pretreatment unit, so that no process fluid leaks along the pump shaft through the shaft exit.

This configuration of the pump according to embodiments of the invention considerably reduces the complexity of the pump, the costs for the pump, the operational costs, the footprint of the pump and the required services, in particular due to the seal-less design and because neither a separate lubrication system nor a barrier fluid system are required.

According to a preferred embodiment a balance drum is fixedly connected to the pump shaft between the hydraulic unit and the throttle device, the balance drum defining a drum front side facing the hydraulic unit and a drum back side, wherein a relief passage is disposed between the balance drum and a first stationary part configured to be stationary with respect to the pump housing, the relief passage extending from the drum front side to the drum back side, and wherein a balance line is provided, which is configured to connect the drum back side to a location where the suction pressure prevails. The balance drum reduces the overall axial thrust acting on the pump shaft and therewith at least reduces the load that has to be carried by a bearing that supports the pump shaft with respect to the axial direction. Furthermore, due to the balance line at the drum back side it is essentially the suction pressure that prevails at the drum back side. Therefore, the throttle device has to seal only the difference between the suction pressure and the ambient pressure prevailing outside of the pump housing.

Furthermore, the balance drum also contributes to center the pump shaft due to the Lomakin effect generated by the process fluid flowing through the relief passage.

It is a preferred measure that the throttle device comprises a throttle device bush, wherein the throttle device bush is fixedly connected to the pump shaft such, that the throttle gap is arranged between the throttle device bush and the stationary seal part. The primary function of the throttle device bush is the reduction of the wear at the pump shaft.

According to a preferred design the hydraulic unit comprises a first set of impellers and a second set of impellers wherein the first set of impellers and the second set of impellers are arranged in a back-to-back arrangement, so that an axial thrust generated by the first set of impellers is directed opposite to an axial thrust generated by the second set of impellers. The back-to-back arrangement has the advantage of at least partially balancing the axial thrust acting on the pump shaft due to the rotating impellers conveying and pressurizing the process fluid.

Regarding the back-to-back arrangement it is advantageous to provide a center bush, which is fixedly connected to the pump shaft between the first set of impellers and the second set of impellers, wherein a balancing passage is disposed between the center bush and a second stationary part configured to be stationary with respect to the pump housing. The center bush with the balancing passage also contributes to center the pump shaft and to reduce the overall axial thrust acting upon the pump shaft.

In addition, the center bush supports the rotordynamic stability both with respect to stiffness and damping in particular of rotor vibrations. The rotor is the entity of the rotating parts of the pump unit, i.e. in particular all impellers as well the pump shaft are part of the rotor of the pump.

Preferably, the process fluid lubricated pump comprises an axial bearing for supporting the pump shaft with respect to the axial direction, wherein the axial bearing is configured as a process fluid lubricated hydrodynamic bearing or as an active magnetic bearing.

In some embodiments the process lubricated pump comprises an axial bearing for supporting the pump shaft with respect to the axial direction, wherein the axial bearing is configured as an active magnetic bearing, and wherein the axial bearing is arranged in the collection chamber. This configuration renders possible the use of an active magnetic bearing in dry running conditions, i.e. the active magnetic bearing is not flooded with the process fluid.

According to a preferred configuration the pump comprises at least one radial bearing for supporting the pump shaft with respect to a radial direction perpendicular to the axial direction, wherein the at least one radial bearing is configured as a process fluid lubricated hydrodynamic bearing. Using at least one process fluid lubricated hydrodynamic radial bearing or using two process fluid lubricated hydrodynamic radial bearings ensures a reliable support of the pump shaft with respect to the radial direction without the need for a separate lubrication system with a lubricant different from the process fluid.

With the hydrodynamic radial bearing it is possible to radially support the pump shaft in a non-contacting manner, meaning that the pump shaft is supported with respect to the radial direction e.g. only by fluid bearings, or support devices, where a fluid, here the process fluid, is between the rotating pump shaft and the surrounding stationary part, so that there is no direct physical contact between the rotating pump shaft and the surrounding stationary part. Another possibility for supporting the pump shaft in a non-contacting manner is providing active magnetic bearing(s) for supporting the shaft. Preferably, the pump according to embodiments of the invention is free of anti-friction bearings such as ball bearings for supporting the pump shaft with respect to the radial direction.

Furthermore, it is a preferred embodiment that the pump comprises at least one hydrostatic support device for providing a radial support to the pump shaft, wherein the hydrostatic support device is preferably configured to provide the support by the Lomakin effect. By providing a hydrostatic support device the number of radial hydrodynamic bearings for supporting the pump shaft can be reduced at least by one radial bearing. Different from hydrodynamic radial bearings, which require a rotation of the pump shaft to generate the radial bearing forces, a hydrostatic support device does not require a rotation of the pump shaft for supporting the pump shaft with respect to the radial direction, but a pressure drop across the supporting device with respect to the axial direction. As it is known in the art, for example, the Lomakin effect requires a pressure drop along an annular gap for the fluid arranged between the pump shaft and a stationary part surrounding the pump shaft. The conventional hydrodynamic radial bearing does not require a mentionable pressure drop across the radial bearing, but needs the rotation of the shaft.

Hydrodynamic radial bearings, which are also designated as hydrodynamic journal bearings, are quite complex and expensive components of a pump. A hydrodynamic radial bearing is one of the components which impact the mean time between maintenance. Thus, reducing the number of hydrodynamic radial bearings for the pump shaft reduces the complexity of the pump as well as the likelihood of a failure of the pump. Furthermore, the reduced number of radial bearings reduces the costs for the pump. By reducing the number of radial bearings, the pump shaft as well as the pressure casing reduce in length, which reduces the weight of the unit. This has an impact on material cost as well as installation costs.

According to a preferred embodiment the pump is configured without a hydrodynamic radial bearing and without any anti-friction bearing. The hydrostatic support device comprises a first throttle bush, which is fixedly connected to the pump shaft between the hydraulic unit and the non-drive end of the pump shaft or at the non-drive end, the first throttle bush defining a first throttle front side facing the hydraulic unit and a first throttle back side, wherein a first throttle passage is disposed between the first throttle bush and a first stationary throttle part configured to be stationary with respect to the pump housing, the first throttle passage extending from the first throttle front side to the first throttle back side, and wherein a supply line is provided configured to supply pressurized process fluid to the first throttle back side.

In this preferred configuration there is no hydrodynamic radial bearing at all for the pump shaft, which considerably reduces the complexity as well as the cost for the pump. By the first throttle bush at the non-drive end of the pump shaft it is possible to center the pump shaft by the Lomakin effect in such a manner that no radial bearing is required for the pump shaft. The balance drum and the relief passage also contribute to the radial support of the pump shaft, because— as already explained—the process fluid flowing along the balance drum through the relief passage generates a centering force acting on the pump shaft due to the Lomakin effect. Thus, the usage of this throttle bush enables removable of both journal bearings, which are required in prior art devices.

According to a preferred design, a second throttle bush is fixedly connected to the pump shaft between the first throttle bush and the non-drive end of the pump shaft or at the non-drive end, the second throttle bush defining a second throttle back side, being different from the first throttle back side, wherein a second throttle passage is disposed between the second throttle bush and a second stationary throttle part configured to be stationary with respect to the pump housing, the second throttle passage extending from the first throttle back side to the second throttle back side. By providing the first and the second throttle bush the effect of centering the pump shaft by the Lomakin effect and therewith the rotordynamic performance can even be improved.

According to a preferred embodiment the pump is configured as a horizontal pump with the pump shaft extending perpendicular to the direction of gravity. However, in particular for such applications, where a minimized footprint of the pump is required it is also possible to configure the pump according to the invention as a vertical pump with the pump shaft extending in the direction of gravity.

In addition, according to embodiments of the invention a pump system is proposed for conveying a process fluid, comprising a process fluid lubricated pump configured according to embodiments of the invention, and a drive unit for driving the pump shaft, wherein the drive unit comprises a drive shaft and an electric motor for rotating the drive shaft, and wherein the drive shaft is connected to the drive end of the pump shaft.

The pump system according to embodiments of the invention has the advantage that the drive unit can be disposed in a separate housing different from the pump housing and can be easily coupled to the pump shaft, because the drive end of the pump shaft is arranged outside the pump housing.

Preferably, the electric motor is configured as a direct drive motor, so that there is no gear box required to couple the electric motor to the pump. Thus, the pump shaft rotates with the same rotational speed as the drive shaft. This measure reduces the complexity of the pump system.

According to a preferred embodiment the electric motor is configured with active magnetic bearings for supporting the drive shaft. Thus, there is no lubrication system required for the drive unit.

Further advantageous measures and embodiments of the invention will become apparent from this disclosure.

BRIEF DESCRIPTION OF THE DRAWINGS

The invention will be explained in more detail hereinafter with reference to the drawings.

DETAILED DESCRIPTION

Figure 1:
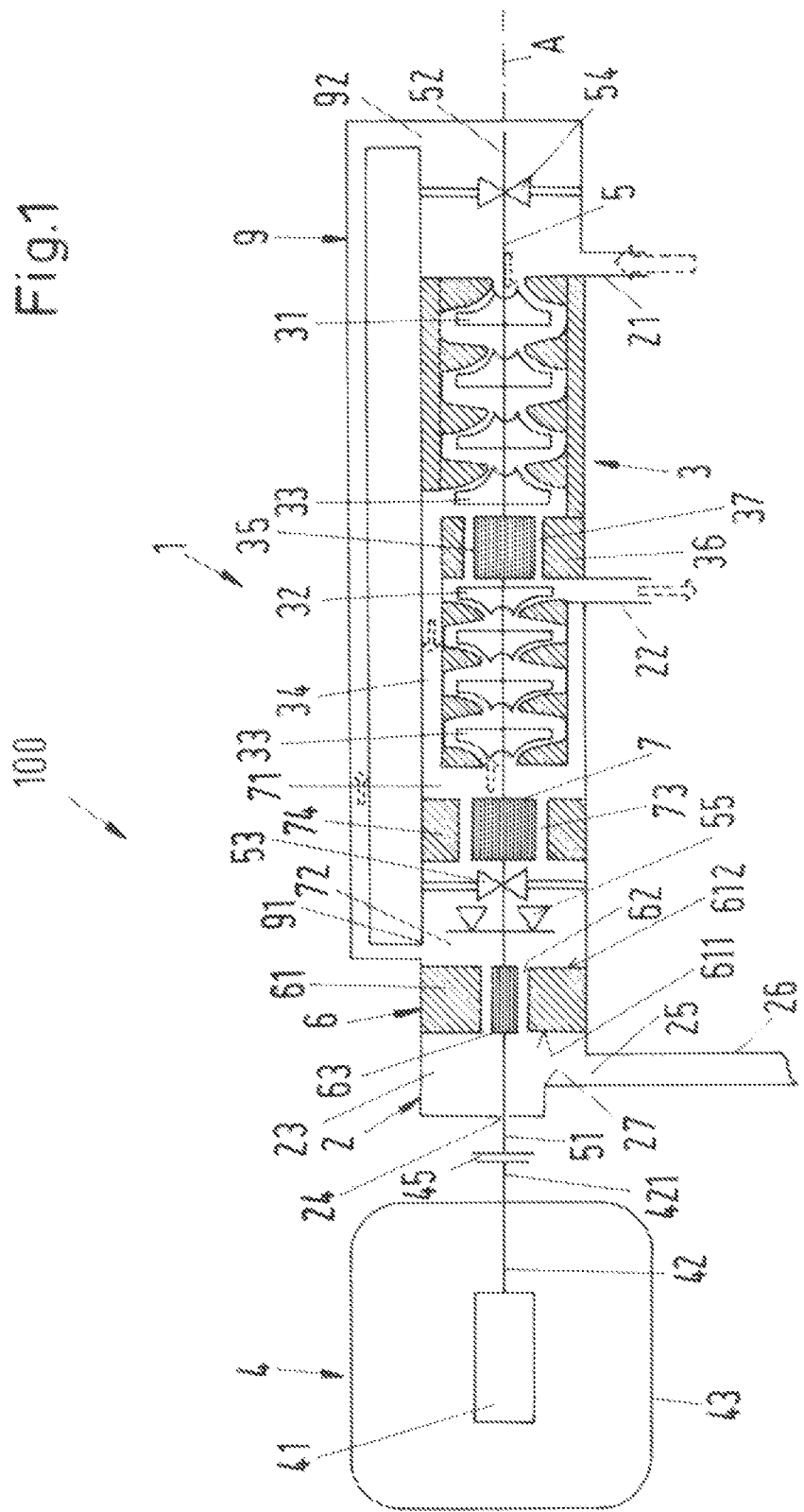
FIG. 1 is a schematic cross-sectional view of an embodiment of a pump system according to the invention comprising a first embodiment of a process fluid lubricated pump according to the invention.

FIG. 1 shows a schematic cross-sectional view of an embodiment of a pump system according to the invention comprising a first embodiment of a process fluid lubricated pump according to the invention. The pump system is designated in its entity with reference numeral 100, and the process fluid lubricated pump is designated in its entity with reference numeral 1. The pump system 100 comprises the process fluid lubricated pump 1 and a drive unit 4 for driving the pump 1, which will be explained in more detail hereinafter.

The pump 1 is designed as a rotary pump for conveying a process fluid and has a pump housing 2, which can be configured for example as a barrel casing. The pump housing 2 is designed as a pressure housing, which is able to withstand the pressure generated by the pump 1 as well as the pressure exerted on the pump 1 by the environment.

In the following description reference is made by way of example to the important application that the process fluid lubricated pump 1 is designed and adapted for being used as a water injection pump 1 in the oil and gas industry, in particular for injecting water into a subterranean oil and/or gas reservoir to increase recovery of hydrocarbons from the subterranean region. By injecting the water into the reservoir, the hydrocarbons are forced to flow towards and out of the production well. Accordingly, the process fluid that is conveyed by the pump 1 is water and especially seawater. The process fluid lubricated pump 1 is for example installed on an oil platform or any other topside location.

It goes without saying that the invention is not restricted to this specific example but is related to process fluid lubricated pumps in general. Embodiments of the invention can be used for many different applications, especially for such applications, where the pump 1 is installed at locations, which are difficult to access. Preferably, the pump 1 according to embodiments of the invention is designed as a water injection pump and configured for top side applications, e.g. for an installation ashore or on an oil platform, in particular on an unmanned platform. In addition, the pump 1 according to embodiments of the invention can also be used for applications outside the oil and gas industry.

The term "process fluid lubricated pump" refers to pumps, where the process fluid that is conveyed by the pump 1 is used for the lubrication and the cooling of components of the pump, e.g. the bearings. The process fluid lubricated pump 1 does not require a lubricant different from the process fluid for the lubrication of the pump components. The process fluid is the sole lubricant used in the pump. In the following description reference is made by way of example to the important application that the process fluid is water, in particular seawater. The term seawater comprises raw seawater, purified seawater, pretreated seawater, filtered seawater, in particular microfiltered seawater and nanofiltered seawater. Of course, the pump 1 according to embodiments of the invention can also be configured for conveying other process fluids than water or seawater, such as super-critical carbon dioxide or any other super-critical fluid.

The pump housing 2 of the pump 1 comprises an inlet 21, through which the process fluid enters the pump 1, and an outlet 22 for discharging the process fluid with an increased pressure as compared to the pressure of the process fluid at the inlet 21. The pressure of the process fluid at the inlet 21 of the pump is referred to as suction pressure. The pressure of the process fluid at the outlet 22 is referred to as discharge pressure. The discharge pressure is higher than the suction pressure. Typically, the outlet 22 is connected to a pipe (not shown) for delivering the pressurized process fluid to a well, in which the process fluid is injected. A typical value for the difference between the discharge pressure and the suction pressure is for example 100 to 200 bar (10-20 MPa). The pressure prevailing outside of the pump housing 2, i.e. the pressure prevailing in the environment, where the pump 1 is deployed, is referred to as ambient pressure. In some applications the suction pressure may be essentially the same as the ambient pressure, in other applications the suction pressure may be considerably higher than the ambient pressure.

The location, from where the process fluid is supplied to the inlet of the pump is referred to as "reservoir". The reservoir can be for example a tank or a natural reservoir such as the sea, a lake or a river. The reservoir can also be a booster pump for pressurizing the process fluid to the required suction pressure or a pretreatment unit for the process fluid, for example a filtration unit.

The pump 1 further comprises a pump shaft 5 extending from a drive end 51 to a non-drive end 52 of the pump shaft 5. The pump shaft 5 is configured for rotating about an axial direction A, which is defined by the longitudinal axis of the pump shaft 5. The drive end 51 of the pump shaft 5 is located outside the pump housing 2 and the non-drive end 52 is located inside the pump housing 2.

The pump 1 further comprises a hydraulic unit 3 with a plurality of impellers 31, 32, 33 for pressurizing the process fluid from the suction pressure to the discharge pressure. The hydraulic unit 3 comprises at least a first stage impeller 31 fixedly mounted on the pump shaft 5 as well as a last stage impeller 32 fixedly mounted on the pump shaft 5. The first stage impeller 31 is the impeller 31 next to the inlet 21 and the last stage impeller 32 is the impeller 32 next to the outlet 22 pressurizing the process fluid such that it is discharged through the outlet 22 with the discharge pressure. Optionally, the hydraulic unit 3 further comprises one or more intermediate stage impeller(s) 33. Each intermediate stage impeller 33 is arranged between the first stage impeller 31 and the last stage impeller 32 when viewed in the direction of increasing pressure, i.e. the direction of the main fluid flow through the hydraulic unit 3. In the first embodiment six intermediate stage impellers 33 are provided, i.e. the pump 1 is configured as an eight stage pump 1. It goes without saying that the number of eight stages is only exemplary. The pump 1 can be designed also as a multistage pump having more or less than eight stages. In the first embodiment the pump unit 3 comprises eight impellers 31, 32, 33 arranged one after another on the pump shaft 5.

In the first embodiment of the pump 1 the impellers 31, 32, 33 are arranged in a back-to-back arrangement. The hydraulic unit 3 comprises a first set of impellers 31, 33 and a second set of impellers 33, 32, wherein the first set of impellers 31, 33 and the second set of impellers 33, 32 are arranged on the pump shaft 5 such, that the axial thrust generated by the first set of impellers 31, 33 is directed opposite to the axial thrust generated by the second set of impellers 33, 32. The first set of impellers 31, 33 comprises the first stage impeller 31 and the three intermediate stage impellers 32 of the next three stages and the second set of impellers 33, 32 comprises the last stage impeller 32 and the three intermediate stage impellers 33 of the three preceding stages. In other embodiments the first set of impellers can comprise a different number of impellers than the second set of impellers.

As indicated in FIG. 1 by the dashed arrows without reference numeral, the process fluid enters the pump 1 through the inlet 21, passes the stages one (first stage), two, three and four, is then guided through a crossover line 34 to the suction side of the fifth stage which is located at the left end of the hydraulic unit 3 (according to the representation in FIG. 1), passes the stages five, six, seven and eight (last stage), and is then discharged through the outlet 22, which is arranged between the left and the right end of the hydraulic unit 3 (according to the representation in FIG. 1).

For many applications the back-to-back arrangement is preferred because the axial thrust acting on the pump shaft 5, which is generated by the first set of impellers 31, 33 counteracts the axial thrust, which is generated by the second set of impellers 33, 32. Thus, the two axial thrusts compensate each other at least partially.

In other embodiments the impellers 31, 32, 33 can be arranged in an inline arrangement. In an inline arrangement the axial thrust generated by the action of the rotating impellers 31, 32, 33 has the same direction for each particular impeller 31, 32, 33.

The drive unit 4, which will be explained in more detail hereinafter, is configured to exert a torque on the drive end 51 of the pump shaft 5 for driving the rotation of the pump shaft 5 and the impellers 31, 32, 33 about the axial direction A.

In the first embodiment the process fluid lubricated pump 1 is configured as a horizontal pump 1, meaning that during operation the pump shaft 5 is extending perpendicular to the vertical direction, which is the direction of gravity. Thus, the axial direction A is perpendicular to the vertical direction.

Figure 2:
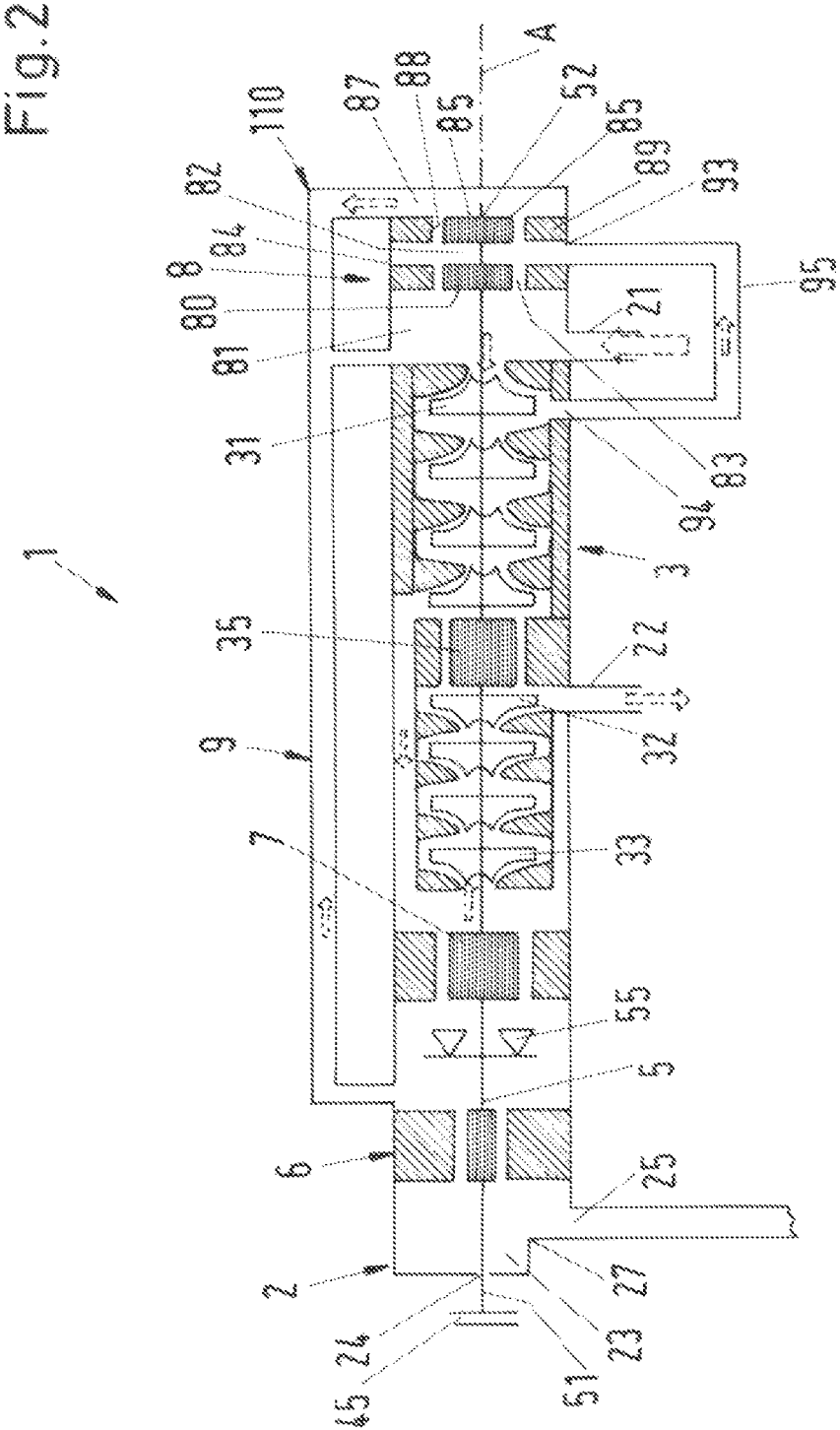
FIG. 2 is a schematic cross-sectional view of a second embodiment of a process fluid lubricated pump according to the invention.
Figure 3:
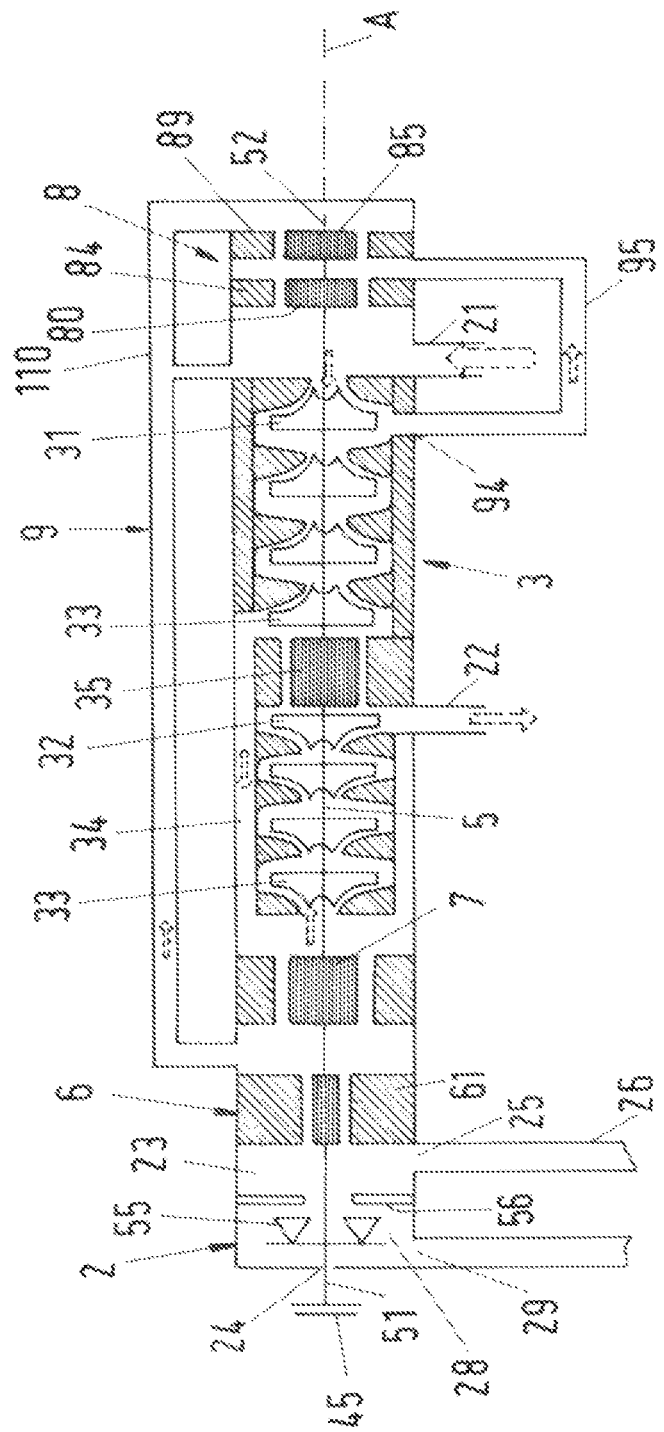
FIG. 3 is a schematic cross-sectional view of a third embodiment of a process fluid lubricated pump according to the invention.

A direction perpendicular to the axial direction is referred to as radial direction. The term 'axial' or 'axially' is used with the common meaning 'in axial direction' or 'with respect to the axial direction'. In an analogous manner the term 'radial' or 'radially' is used with the common meaning 'in radial direction' or 'with respect to the radial direction'. Hereinafter relative terms regarding the location like "above" or "below" or "upper" or "lower" or "top" or "bottom" "left" "right" refer to the usual operating position of the pump 1. FIG. 1, FIG. 2 and FIG. 3 show different embodiments of the pump 1 in their respective usual operating position.

The process fluid lubricated pump 1 is designed as a seal-less pump. The seal-less pump 1 is a pump that has no mechanical seals for the sealing of the rotating pump shaft 5. A mechanical seal is a seal for a rotating shaft comprising a rotor part fixed to the shaft and rotating with the shaft as well as a stationary stator part fixed with respect to the housing. During operation the rotor part of the mechanical seal and the stator part of the mechanical seal are sliding along each other—usually with a liquid film between the seal faces—for providing a sealing action to prevent the process fluid from escaping to the environment or entering the drive of the pump. For limiting the leakage of the barrier fluid between the seal faces it is a known measure that the rotor part and the stator part of the mechanical seal are pressed towards each other with springs in order to minimize the gap between the seal faces.

At standstill of the pump, the seal faces will be pressed against each other and there will be no leakage through the closed gap between the seal faces. During rotation the seal faces lift off and a fluid film establishes between the seal faces. This fluid film is in order of micrometers thick. The leakage through this micrometers large gap between the seal faces is neglectable and is in the order of magnitude of a few liters per week.

Furthermore, a mechanical seal requires cooling (due to the low leakage rate). The barrier fluid is circulated in the seal chamber and removes the heat which is generated in the mechanical seal. A cooling system is thus needed to cool down the barrier fluid.

In addition, a mechanical seal usually needs a hydraulic pressure unit, which pressurizes the barrier fluid, so that the barrier fluid is at a higher pressure than the process fluid to ensure that it will always be clear barrier fluid leaking through the mechanical seal, but no process fluid. In case of varying process pressure, e.g. a varying suction pressure, the hydraulic pressure unit needs to follow those pressure variations.

The seal-less pump 1 shown in FIG. 1 has no such mechanical seals and therefore, the overall complexity is considerably reduced.

The process fluid lubricated pump 1 comprises a throttle device 6 which is arranged between the hydraulic unit 3 and a collection chamber 23, which is arranged in the pump housing 2. The collection chamber 23 is arranged at an end of the pump housing 2, namely at that end of the pump housing 2, where the pump shaft 5 passes through the pump housing 2 to the outside of the pump housing 2. According to the representation in FIG. 1 the collection chamber 23 is located at the left end of the pump housing 2. The collection chamber 23 comprises a shaft exit 24, through which the pump shaft 5 passes from the inside to the outside of the pump housing 2. The collection chamber 23 further comprises a fluid exit 25 for discharging the process fluid collected in the collection chamber 23. The collection chamber 23 can further comprise a protrusion 27 that is arranged and configured such that the process fluid leaves the collection chamber 23 through the fluid exit 25 and is prevented from leaving the collection chamber 23 through the shaft exit 24.

The function of the throttle device 6 is to limit the flow of process fluid towards the collection chamber 23 which is at ambient pressure and in open contact with the environment. This is done by introducing a flow resistance, which throttles the pressure of the process fluid to ambient pressure.

A return line 26 is connected to the fluid exit 25 for recycling the process fluid collected in the collecting chamber 23. During operation of the pump 1 the ambient pressure prevails in the collection chamber 23, i.e. on both sides of the shaft exit 24 the same pressure prevails. The return line 26 is also connected to any location where the pressure of the process fluid equals ambient pressure. This might be for example the reservoir or the entrance of a pumping device for recycling the process fluid.

The collecting chamber 23 is delimited by the throttle device 6, which is arranged between the hydraulic unit 3 and the collection chamber 23 with respect to the axial direction A. The throttle device 6 acts like a usual throttle and reduces the pressure to the ambient pressure prevailing in the collecting chamber 23. In particular, the throttle device 6 is configured to seal the pump shaft 5 in a non-contacting manner, i.e. without a physical contact of the pump shaft 5 or a rotating part co-rotating with the pump shaft 5 and a stationary component which is stationary with respect to the pump housing 2. There is always process fluid between rotating components and stationary components.

The throttle device 6 comprises a stationary throttle part 61 having a generally annular shape. The stationary throttle part 61 surrounds the pump shaft 5 and is arranged stationary with respect to the pump housing 2. The stationary throttle part 61 has a first axial face 611 and a second axial face 612 delimiting the stationary throttle part 61 with respect to the axial direction A, wherein the first axial face 611 faces the collection chamber 23. The throttle device 6 further comprises a throttle gap 62 surrounding the pump shaft 6 and extending from the first axial face 611 to the second axial face 612 for allowing a leakage of the process fluid along the pump shaft 5 into the collection chamber 23. The throttle gap 62 is here configured as an annular gap and radially outwardly delimited by the stationary throttle part 61.

The throttle device 6 can comprise—as shown e.g. in FIG. 1—as throttle gap 62 a simple narrow and preferably annular gap between the pump shaft 5 and the stationary throttle part 61. In other embodiments, more complex designs can be realized as well, such as a throttle gap 62 which is stepwise decreasing in diameter to introduce some pumping effects which counter-act the leakage. In order to increase the pumping effect, there could be some pumping vanes as well on the faces of the steps.

Optionally, the throttle device 6 can comprise a throttle device bush 63, wherein the throttle device bush 63 is fixedly connected to the pump shaft 5 to co-rotate with the pump shaft 5. The primary function of the throttle device bush 63 is the protection of the pump shaft 5 against wear. In embodiments, where the throttle device 6 comprises the throttle device bush 63, the throttle gap 62 is arranged between the throttle device bush 63 and the stationary throttle part 61.

The pump 1 further comprises a balance drum 7 for at least partially balancing the axial thrust that is generated by the impellers 31, 32, 33 during operation of the pump 1. The balance drum 7 is fixedly connected to the pump shaft 5 in a torque-proof manner and arranged between the hydraulic unit 3 and the throttle device 6. The balance drum 7 defines a drum front side 71 and a drum back side 72. The drum front side 71 is the side or the space facing the hydraulic unit 3. The drum back side 72 is the side or the space facing the throttle device 6. The balance drum 7 is surrounded by a first stationary part 74, so that a relief passage 73 is formed between the radially outer surface of the balance drum 7 and the first stationary part 74. The first stationary part 74 is configured to be stationary with respect to the pump housing 2. The relief passage 73 forms an annular gap between the outer surface of the balance drum 7 and the first stationary part 74 and extends from the drum front side 71 to the drum back side 72.

A balance line 9 is provided connecting the drum back side 72 to a location, where the suction pressure or at least approximately the suction pressure prevails. The balance line 9 constitutes a flow connection between the drum back side 72 and a location at the non-drive end 52 of the pump shaft 5, where essentially the suction pressure prevails. The balance line 9 can be arranged outside the pump housing 2 and extend from a first port 91 at the drum back side 72 to a second port 92 near the non-drive end 52 of the pump shaft 5. In other embodiments the balance line 9 can be configured as an internal line completely extending inside the pump housing 2. Due to the balance line 9 the pressure at the drum back side 72 is essentially the suction pressure.

The drum front side 71 is in fluid communication with the entrance to the intermediate stage impeller 33 of the fifth stage, which is the stage, in which the crossover line 34 discharges. During operation, at this location at the entrance to the intermediate stage impeller 33 an intermediate pressure prevails, which is larger than the suction pressure and smaller than the discharge pressure. In the back-to-back arrangement of the first embodiment of the pump 1 the intermediate pressure is essentially in the middle between the suction pressure and the discharge pressure, i.e. the intermediate pressure is at least approximately the suction pressure plus half the difference between the discharge pressure and the suction pressure.

The axial surface of the balance drum 7 facing the drum front side 71 is exposed to the intermediate pressure during operation of the pump 1. Since the drum back side 72 is exposed essentially to the suction pressure, there is a considerably large pressure drop over the balance drum 7. The difference of the pressure prevailing at the drum front side 71 and the drum back side 72 results in a force that is directed to the left in the axial direction A (according to the representation in FIG. 1) and therewith counteracts the axial thrust generated by the first set of impellers 31, 33 during operation of the pump 1, which is directed to the right in the axial direction A (according to the representation in FIG. 1).

The pressure difference between the pressure prevailing at the drum back side 72 and the ambient pressure prevailing in the collection chamber 23 is sealed by the throttle device 6. The first axial face 611 of the stationary throttle part 61 is exposed to the ambient pressure and the second axial face 612 of the stationary throttle part 61 is exposed to the pressure prevailing at the drum back side 72, i.e. essentially the suction pressure.

As a further balancing device for reducing the overall axial thrust acting on the pump shaft 5, a center bush 35 is arranged between the first set of impellers 31, 33 and the second set of impellers 33, 32. The center bush 35 is fixedly connected to the pump shaft 5 in a torque proof manner and rotates with the pump shaft 5. The center bush 35 is arranged on the pump shaft 5 between the last stage impeller 32, which is the last impeller of the second set of impellers, and the intermediate stage impeller 33 of the fourth stage, which is the last impeller of the first set of impellers 31, 33, when viewed in the direction of increasing pressure, respectively. The center bush 35 is surrounded by a second stationary part 36 being stationary with respect to the pump housing 2. An annular balancing passage 37 is formed between the outer surface of the center bush 35 and the second stationary part 36.

The function of the center bush 35 and the balancing passage 37 is in principle the same as the function of the balance drum 7 and the relief passage 73. At the axial surface of the center bush 35 facing the last stage impeller 32 the high pressure prevails, and at the other axial surface facing the intermediate impeller 33 of the fourth stage a pressure prevails with essentially equals the intermediate pressure, i.e. a pressure, which is higher than the suction pressure and lower than the discharge pressure, e.g. in the middle between the suction pressure and the discharge pressure. Therefore, the process fluid can pass from the last stage impeller 32 through the balancing passage 37 to the intermediate stage impeller 33 of the fourth stage.

The pressure drop over the center bush 35 results in a force that is directed in the axial direction to the right (according to the representation in FIG. 1) and therewith counteracts the axial thrust directed in the axial direction A to the left (according to the representation in FIG. 1) is generated by the second set of impellers 33, 32, namely the intermediate stage impellers 33 of the fifth, sixth and seventh stage and the last stage impeller 32.

For supporting the pump shaft 5, the pump 1 comprises a first radial bearing 53, a second radial bearing 54 and an axial bearing 55. All bearings 53, 54, 55 are arranged inside the pump housing 2. The first radial bearing 53 is arranged at the drum back side 72, i.e. between the balance drum 7 and the throttle device 6. The second radial bearing 54, is arranged between the hydraulic unit 3 and the non-drive end 52 of the pump shaft 5 or at the non-drive end 52. The radial bearings 53, 54 are configured to support the pump shaft 5 with respect to the radial direction. The axial bearing 55 is arranged between the first radial bearing 54 and the throttle device 6. The axial bearing 55 is configured to support the pump shaft 5 with respect to the axial direction A.

A radial bearing, such as the first radial bearing 53 and the second radial bearing 54 is also referred to as a "journal bearing" and an axial bearing, such as the axial bearing 55, is also referred to as a "thrust bearing".

Both the first radial bearing 53 and the second radial bearing 54 are configured as a process fluid lubricated hydrodynamic bearing. The axial bearing 55 is also configured as a process fluid lubricated hydrodynamic bearing. The characterizing feature of a hydrodynamic radial bearing 53, 54 as well as of a hydrodynamic axial bearing 55 is that the rotation of the pump shaft 5 is required to generate the bearing forces. By the rotation of the pump shaft a liquid wedge is created between the pump shaft 5 and a stationary sealing component. This wedge lifts the pump shaft so that a hydrodynamic bearing is realized. Hydrodynamic bearings can be configured e.g. as tilting pad bearing, as cylindrical sleeve bearing or as multi lobe bearing.

The bearing choice can be optimized in function of the process fluid properties. When the process fluid is very clean, normal bearings can be used, such, as example, simple white metal bearings or polymer lined bearings. When the fluid has for example a high sand loading, so called "hard" bearings can be used, such as for example ceramic bearings, diamond bearings, diamond composite bearings or diamond-ceramic composite bearings.

As an alternative, the axial bearing 55 can be configured as an active magnetic bearing. An active magnetic bearing does not require a lubricant and can be flooded with the process liquid or can be running dry in air.

In many embodiments the bearings 53, 54, 55 are arranged in separate bearing housing which are fixedly connected to the pump housing 2. For example, the first radial bearing 53 and the axial bearing 55 can be arranged in a first bearing housing which is fixedly mounted to the pump housing 2, and the second radial bearing 54 can be arranged in a second bearing housing which is fixedly mounted to the pump housing 2.

The drive unit 4 of the pump system 100 comprises a separate motor housing 43, an electric motor 41, a drive shaft 42 extending in the axial direction A and motor bearings, which are not shown in detail. The electric motor 41, which is arranged inside the motor housing 43 is configured for rotating the drive shaft 42 about the axial direction A. The drive shaft 42 has an end 421, which is arranged outside the motor housing 43. The end 421 of the drive shaft 42 is connected to the drive end 51 of the pump shaft 5 by means of a coupling 45 for transferring a torque to the pump shaft 5. Preferably the coupling 45 is configured as a flexible coupling 45, which connects the drive shaft 42 to the pump shaft 5 in a torque proof manner, but allows for a relative movement between the drive shaft 42 and the pump shaft 5, e.g. lateral movements. Thus, the flexible coupling 45 transfers the torque but no or nearly no lateral vibrations. The flexible coupling 45 can be configured as a mechanical coupling, a magnetic coupling, a hydrodynamic coupling or any other coupling that is suited to transfer a torque from the drive shaft 42 to the pump shaft 5.

Preferably, the electric motor 41 is configured as a direct drive motor 41, meaning that there is no gear between the electric motor 41 and the pump shaft 5. The rotor of the electric motor 41 and the drive shaft 42 and the pump shaft 5 rotate all with the same rotational speed.

The electric motor 41 is configured to operate with a variable frequency drive (VFD), in which the speed of the drive, i.e. the frequency of the rotation is adjustable by varying the frequency and/or the voltage supplied to the electric motor 41. Preferably, the electric motor 41 is designed as a high speed drive for generating the required rotational speed of the pump shaft 5.

Furthermore, to avoid the requirement of a lubrication system for the drive unit 4, in particular the bearings of the drive unit 4, it is a preferred option to configure the drive unit 4 with active magnetic bearings for supporting the drive shaft 42. Drive units 4 with an electric motor 41 and active magnetic bearings for supporting the drive shaft 42 are known in the art and available on the market.

The proposed pump system 100 having the independent drive unit 4 with the separate motor housing 43 and the independent process fluid lubricated pump 1 with the separate pump housing 2 has the advantage that it is more energy efficient than pump systems where the pump and the drive unit are arranged in a common housing. For an integrated machine, in which the motor and the pump are integrated in a common housing, in case of a seal-less design, the motor will be flooded with process fluid, which will generate significant drag losses in the rotor-stator gap in the motor. An integrated machine, at the other hand, has the advantage that there will be zero process fluid leaking out of the machine housing. This is not very important for water application for which the leakage stream can be easily recovered, but it is essential for liquid gasses applications such as liquid $CO_2$ or volatile toxic fluids.

According to other embodiments the process fluid lubricated pump 1 can be configured as a vertical pump, meaning that during operation the pump shaft 5 is extending in the vertical direction, which is the direction of gravity. In such embodiments the axial direction A coincides with the vertical direction. When the process lubricated pump 1 is configured as a vertical pump it is preferred that the drive unit 4 is arranged above the process fluid lubricated pump, meaning that the pump shaft 5 exits the pump housing 2 at the top side of the pump housing 2. Configuring the process fluid lubricated pump as a vertical pump has the advantage that the footprint of the pump can be decreased, which is an important advantage at such location, where the available place is restricted, e.g. on an (oil) platform or an FPSO.

During operation of the process fluid lubricated pump 1 the process fluid is supplied with the suction pressure to the inlet 21 from the reservoir, which might be for example a pretreatment unit or a natural reservoir. The process fluid passes the first four stages of the pump 1 and is then guided by the crossover line 34 to the entrance of the intermediate stage impeller 33 of the fifth stage located at the drum front side 71, where the intermediate pressure prevails. From the drum front side 71 the main stream of the process fluid passes through the stages five, six, seven and the last stage. The last stage impeller 32 conveys the process fluid to the outlet 22, where the process fluid is discharged from the pump 1 with the discharge pressure.

A smaller part of the process fluid conveyed by the last stage impeller 32 passes through the balancing passage 37 along the center bush 35 to the back side of the intermediate stage impeller 33 of the fourth stage, where essentially the intermediate pressure prevails.

A part of the processes fluid passes from the drum front side 71 through the relief passage 73 along the balance drum 7 to the drum back side 72, where essentially the suction pressure prevails. The term "essentially" indicates inter alia that there is a small pressure drop over the first radial bearing 53, the axial bearing 55, the balance line 9 and the second radial bearing 54, however, the pressure drop is typically negligible compared to the pressure drop over the balance drum 7.

In front of the balance drum 7, i.e. at the drum front side 71, there can be a sand removal device in order to reduce the sand content of the fluid which passes through the relief passage 73. By reducing the sand content of the process fluid flowing through the relief passage 73 there will be less wear at the balance drum 7 and at the first stationary part 74, In addition, there is a smaller risk of wear in the bearings 53, 55 due to erosion related to the sand particles. An example of such a sand removal device in front of the balance drum 7 can be found in the U.S. Pat. No. 8,858,157. The sand removal device, shown in the patent, can be configured as an integrated device integrated into the balance drum.

At the drum back side 72 the process fluid passes through the first radial bearing 53 and the axial bearing 55 for lubricating and cooling the two bearings 53, 55, which are both configured as process fluid lubricated bearings 53, 54. From the room between the axial bearing 55 and the throttle device 6 the main part of the process fluid enters the balance line 9 and a smaller leakage flow of the process fluid leaks through the throttle gap 62 of the throttle device 6 into the collection chamber 23. From the collection chamber 23 the process fluid is discharged and recycled through the return line 26. The optional protrusion 27 in the collection chamber can be supportive to prevent the process fluid from escaping through the shaft exit 24.

The process fluid entering the balance line 9 flows through the balance line 9 and is discharged in a room between the second radial bearing 54 and the part of the pump housing 2 adjacent to the non-drive end 52 of the pump shaft 5. From there the process fluid passes through the second radial bearing 54 for lubricating and cooling the second radial bearing 54. After having passed the second radial bearing 54 the process fluid merges with the process fluid entering the pump 1 through the inlet 21.

FIG. 2 shows a schematic cross-sectional view of a second embodiment of a process fluid lubricated pump 1 according to the invention.

In the following description of the second embodiment of the process fluid lubricated pump 1 only the differences to the first embodiment are explained in more detail. The explanations with respect to the first embodiment are also valid in the same way or in analogously the same way for the second embodiment. Same reference numerals designate the same features that have been explained with reference to the first embodiment or functionally equivalent features. In particular, the drive unit 4 which has been explained in connection with the first embodiment of the pump 1 can also be combined with the second embodiment of the process lubricated pump 1 to form a pump system 100 according to the invention.

Compared to the first embodiment, it is the main difference that the second embodiment of the process fluid lubricated pump 1 is configured without any hydrodynamic radial bearing for supporting the pump shaft 5 with respect to the radial direction. Furthermore, the pump 1 is free of anti-friction bearings (e.g. ball bearings) for supporting the pump shaft with respect to the radial direction. The pump shaft 5 is radially supported in a non-contacting manner meaning that the pump shaft 5 is supported with respect to the radial direction without a direct contact between the rotating pump shaft 5 and the surrounding stationary part. The pump shaft 5 is preferably supported with respect to the radial direction only by support devices, where a fluid is between the rotating pump shaft 5 and the surrounding stationary part.

The pump 1 pump comprises at least one hydrostatic support device 8 for providing a radial support to the pump shaft, wherein the hydrostatic support device 8 is preferably configured to provide the support by the Lomakin effect. Different from hydrodynamic radial bearings, which require a rotation of the pump shaft 5 to generate the radial bearing forces, the hydrostatic support device does not require a rotation of the pump shaft 5 for supporting the pump shaft 5 with respect to the radial direction, but a pressure drop across the support device 8 with respect to the axial direction. As it is known in the art, for example, the Lomakin effect requires a pressure drop along an annular gap for the fluid arranged between the pump shaft 5 and a stationary part surrounding the pump shaft. The conventional hydrodynamic radial bearing does not require a mentionable pressure drop across the radial bearing, but needs the rotation of the shaft.

In the second embodiment of the process fluid lubricated pump 1 the hydrostatic support device 8 comprises a first throttle bush 80, which is fixedly connected to the pump shaft 5 between the first stage impeller 31 and the non-drive end 52 of the pump shaft 5 or at the non-drive end 52. The first throttle bush 80 defines a first throttle front side 81 and a first throttle back side 82. The first throttle front side 81 is the side or the space facing the first stage impeller 31. The first throttle back side 82 is the side or the space facing the non-drive end 52 of the pump shaft 5. The first throttle bush 80 is surrounded by a first stationary throttle part 84, so that a first throttle passage 83 is formed between the radially outer surface of the first throttle bush 80 and the first stationary throttle part 84. The first stationary throttle part 84 is configured to be stationary with respect to the pump housing 2. The first throttle passage 83 forms an annular gap between the outer surface of the first throttle bush 80 and the first stationary throttle part 84 and extends from the first throttle front side 81 to the first throttle back side 82. The first throttle front side 81 is in fluid communication with the inlet 21, so that the axial surface of the first throttle bush 80 facing the first throttle front side 81 is exposed to the suction pressure prevailing at the inlet 21 during operation of the pump 1.

Furthermore, the pump 1 comprises a second throttle bush 85, which is fixedly connected to the pump shaft 5 between the first throttle bush 80 and the non-drive end 52 of the pump shaft 5 or at the non-drive end 52. The second throttle bush 85 defines a second throttle front side, which is identical with the first throttle back side 82, and a second throttle back side 87, being different from the first throttle back side 82. The second throttle back side 87 is the side or the space facing the non-drive end 52 of the pump shaft 5. The second throttle bush 85 is surrounded by a second stationary throttle part 89, so that a second throttle passage 88 is formed between the radially outer surface of the second throttle bush 85 and the second stationary throttle part 89. The second stationary throttle part 89 is configured to be stationary with respect to the pump housing 2. The second throttle passage 88 forms an annular gap between the outer surface of the second throttle bush 85 and the second stationary throttle part 89 and extends from the first throttle back side 82 to the second throttle back side 87. The second throttle back side 87 is in fluid communication with a recycle line 110 for recycling the process fluid to the suction pressure side. Thus, the recycle line 110 is also in fluid communication with the pump inlet 21 or with any other location, at which the suction pressure prevails. Therefore, the flow recirculated through the recycle line 110 may reenter the pump 1. As shown in FIG. 2 it is also possible that the recycle line 110 is connected to the balance line 9.

A supply line 95 is provided, which is configured to supply pressurized process fluid to the first throttle back side 82. The supply line 95 is in fluid communication with a third port 93, located at the first throttle back side 82. The supply line 95 is also in fluid communication with a first intermediate take-off 94 arranged at a discharge side of the first stage impeller 31—as shown in FIG. 2—or at a discharge side of any of the intermediate stage impellers 33 or at a discharge side of the last stage impeller 32.

Since the pressurized process fluid is supplied to the first throttle back side 82, i.e. between the first throttle bush 80 and the second throttle bush 85, the first throttle bush 80 will experience an axial force directed to the left in axial direction A (according to the representation in FIG. 2), while the second throttle bush 85 will experience an axial force directed in the opposite direction, namely to the right in axial direction A. Therefore, this double throttle bush design has the additional advantage, that the axial forces acting on the first throttle bush 80 and the second throttle bush 85, respectively, compensate each other at least partially.

For many applications, it is preferred and also sufficient, when the first intermediate take-off 94 is arranged at the discharge side of the first stage impeller 31. The first stage impeller 31 can, for example, generate a pressure increase of 40 bar (4 MPa). This pressure difference is usually sufficient for supplying the throttle passages 83, 88 with pressurized process fluid. Due to the first intermediate take-off 94, the flow through the first stage impeller 31 is higher than the flow through the intermediate stage impellers 33 and the last stage impeller 32. Therefore, it is preferred that the first stage impeller 31 is designed differently than the other impellers 32, 33. Each impeller 31, 32, 33 is preferably configured such that it operates at or close to its best efficiency point. To account for the higher flow through the first stage impeller 31 it is for example possible that the first stage impeller 31 is designed with the same specific speed as the other impellers 32, 33 but with a larger diameter. It is also possible, to design the first stage impeller 31 with the same diameter as the other impellers 32, 33, but with a higher specific speed.

Of course, it is also possible, that all impellers 31, 32, 33 are designed identically. Furthermore, each impeller 31, 32, 33 is designed as a radial impeller 31, 32, 33.

The supply line 95 connects the first intermediate take-off 94 with the third port 93, so that the pressurized process fluid flows from the first intermediate take-off 94 through the third port 93 to the first throttle back side 82, i.e. into the space between the first throttle bush 80 and the second throttle bush 85. The flow entering through the third port 93 is divided into two partial flows. The first partial flow flows through the first throttle passage 83 to the first throttle front side 81 at the inlet 21, i.e. to the suction pressure side, and the second partial flow flows through the second throttle passage 88 and the recycle line 100 to the suction pressure side at the inlet 21. If the first throttle bush 80 and the second throttle bush 85 have the same dimensions and the first throttle passage 83 and the second throttle passage 88 have the same dimensions the pressure drop over the first throttle bush 80 is essentially the same as the pressure drop over the second throttle bush 85. The first partial flow through the first throttle passage 83 is directed to the left in the axial direction A (according to the representation in FIG. 2) and the second partial flow through the second throttle passage 88 is directed to the right in the axial direction A (according to the representation in FIG. 2).

Both partial flows, i.e. the flow through the first throttle passage 83 and the flow through the second throttle passage 88 generate a centering effect on the pump shaft 5 due to the Lomakin effect. This centering effect is strong enough so that at least one of the two journal pump bearings, which are usually provided in the pumps known from the prior art can be dispensed with. In the second embodiment of the process fluid lubricated pump 1 both radial bearings are dispensed with, i.e. the pump 1 has no classical journal or radial pump bearing for supporting the pump shaft 5 with respect to the radial direction. The pump shaft 5 is supported with respect to the radial direction by the Lomakin effect generated by the flow through the first throttle passage 83 and the second throttle passage 88, which centers the pump shaft 5. In addition, the flow through the throttle passages 83, 88 also improves the overall rotordynamic performance of the pump 1. The flow through the relief passage 73 along the balance drum 7 as well as the flow through the balancing passage 37 along the center bush 35 also cause a centering effect on the pump shaft 5 due to the Lomakin effect and thus contributes to support the pump shaft 5 with respect to the radial direction.

The flow of the process fluid through the pump 1 including the flow through the balance line 9, the recycle line 110 and the supply line 95 is indicated in FIG. 2 by the arrows in dashed lines without reference numeral. Each of the balance line 9, the recycle line 110, and the supply line 95 can be configured as an external line that extends at least partially outside the pump housing 2 or as an internal line completely extending within the pump housing 2.

The fact that the number of classical radial pump bearings can be at least reduced as compared to conventional pumps is very advantageous, because classical radial bearings such as radial tilting pad bearings, which are usually used in process fluid lubricated pumps, are very complex, expensive and a potential source of failures.

It has to be noted that the throttle bush 80 or 85, the stationary throttle part 84 or 89 and the throttle passage 83 or 88 constitute a hydrostatic support device that cannot be compared with a hydrodynamic radial bearing, because the functional principle is completely different. As already said, in a hydrodynamic journal bearing the rotation of the pump shaft 5 is required to generate the bearing forces. A wedge of lubricant is created between the rotating shaft and a stationary component of the bearing, which lifts the rotating pump shaft from the stationary component of the journal bearing. Thus, the hydrodynamic bearing requires the rotation of the shaft, otherwise it does not work. Furthermore, there is nearly no flow of fluid through the journal bearing, in particular in axial direction A. Only the fluid film between the stationary pads of the bearing and the rotating counterpart has to be cooled, but this results only in a negligible cooling flow. Contrary to that, the device with the throttle bush 80 or 85 is based upon the Lomakin effect, meaning it requires a considerable flow through the throttle passage 83 or 88 as well as a considerable pressure drop over the throttle bush 80 or 85. However, the device with the throttle bush 80 or 85 does not require a rotation of the pump shaft 5 to generate the Lomakin effect which centers the pump shaft 5 with respect to the stationary throttle part 84 or 89, it just requires a pressure difference over the throttle passage 83 or 88.

It has to be noted, that the first embodiment of the process fluid lubricated pump 1 and the second embodiment of the process fluid lubricated pump 1 can be combined to such embodiments where exactly one process fluid lubricated hydrodynamic radial bearing 53 or 54 is provided for the support of the pump shaft 5 with respect to the radial direction. In such embodiments with exactly one hydrodynamic radial bearing 53 or 54 at least one hydrostatic support device 8 is provided for also supporting the pump shaft 5 with respect to radial direction. The hydrostatic support device 8 can be configured with the first throttle bush 80 and the second throttle bush 85 or with only the first throttle bush 80. In addition or alternatively at least one of the balance drum 7 and the center bush 35 can be used as hydrostatic support device.

Regarding such embodiments, in which the process fluid lubricated pump 1 comprises exactly one hydrodynamic radial bearing 53 or 54 for supporting the pump shaft 5 with respect to the radial direction, it is possible to arrange the radial bearing 53 between the balance drum 7 and the collection chamber 23, as it is shown in FIG. 1 for the first radial bearing 53 and to dispense with the second radial bearing 54 at the non-drive end 52 of the pump shaft 5. It is also possible to arrange the one radial bearing 54 at or near the non-drive end 52 of the pump shaft 5, as it is shown in FIG. 1 for the second radial bearing 54 and to dispense with the first radial bearing 53 next to the balance drum 7.

FIG. 3 shows a schematic cross-sectional view of a third embodiment of a process fluid lubricated pump 1 according to the invention.

In the following description of the third embodiment of the process fluid lubricated pump 1 only the differences to the first and the second embodiment are explained in more detail. The explanations with respect to the first and the second embodiment are also valid in the same way or in analogously the same way for the third embodiment. The same reference numerals designate the same features that have been explained with reference to the first and the second embodiments or functionally equivalent features. In particular, the drive unit 4 which has been explained in connection with the first embodiment of the pump 1 can also be combined with the third embodiment of the process lubricated pump 1 to form a pump system 100 according to an embodiment of the invention.

Compared to the first and the second embodiment, the third embodiment of the process fluid lubricated pump according to the invention offers an alternative for the arrangement of the axial bearing 55, which can be applied both to the first and the second embodiment. This alternative is particularly suited, when the axial bearing 55 shall not be flooded with the process fluid or shall be operated under dry running conditions.

According to the third embodiment of the process fluid lubricated pump 1 the axial bearing 55 is arranged in the collection chamber 23 adjacent to the shaft exit 24 for the pump shaft 5. Preferably, the axial bearing 55 is configured as an active magnetic thrust bearing 55, which supports the pump shaft 5 with respect to the axial direction A by means of magnetic forces, which are actively controllable. Since the process fluid leaking through the throttle device 6 into the collection chamber 23 is discharged through the fluid exit 25 and the return line 26, the axial bearing 55 will usually not get in contact with the process fluid. Thus, the axial bearing 55 can be operated under dry running conditions. In particular the axial bearing 55 is neither flooded with nor lubricated by the process fluid.

For some applications it might be advantageous to arrange a shield or a baffle 56 between the fluid exit 25 and the axial bearing 55 to avoid that a larger amount of the process fluid gets in contact with the axial bearing 55. By the baffle 56 a dry chamber 28 is created in the collection chamber 23, wherein the dry chamber 28 is arranged between the baffle 56 and the shaft exit 24. The baffle 56 can be configured in any manner that prevents the process fluid from entering the dry chamber 28 at least in a larger amount. Preferably the baffle 56 is not in direct physical contact with the pump shaft 5. As a further advantageous measure a drainage exit 29 can be disposed in the dry chamber 28 for discharging any process fluid from the dry chamber 28, in case there is a spill-over of the process fluid into the dry chamber 28. By means of the drainage exit 29 any accumulating of the process fluid in the dry chamber 28 is effectively avoided.

When there is the baffle 56 provided for delimiting the dry chamber within the collection chamber 23, the protrusion 27 is usually not provided for.

Figure 4:
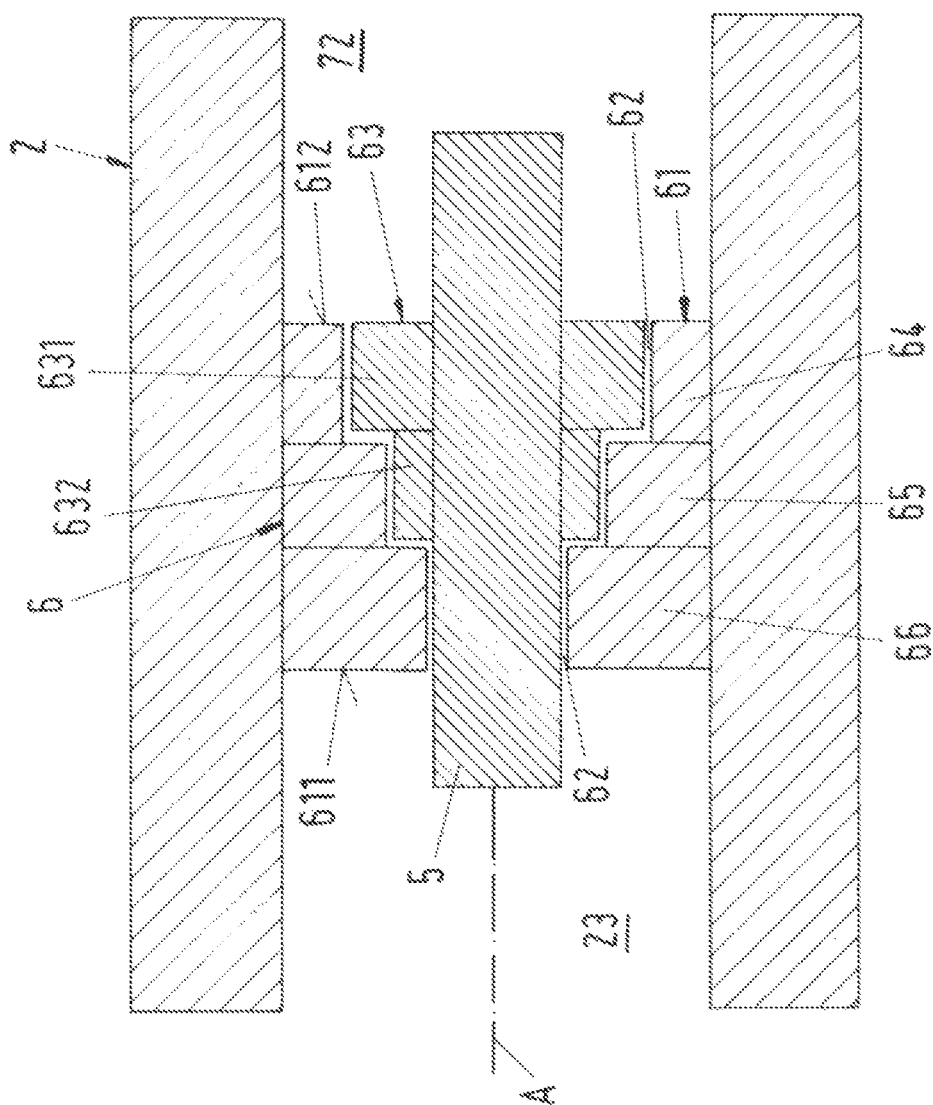
FIG. 4 is a schematic cross-sectional view of a first variant for the throttle device.

FIG. 4 shows a schematic cross-sectional view of a first variant for the throttle device 6. The first variant can be used for all embodiments of the process fluid lubricated pump 1.

According to the first variant the throttle gap 62 of the throttle device 6 has a more complex structure than a simple annular gap. When viewed in the axial direction A the throttle gap 62 has a stepped configuration. This might be realized for example by configuring the stationary throttle part 61 with a plurality, here three, annular components 64, 65 and 66 which are arrange one after another with respect to the axial direction A, wherein adjacent annular components 64, 65 and 65, 66 are abutting against each other. Of course it is also possible to form the entirety of annular components as one part. The three annular components have all the same outer diameter but different inner diameters. The annular component 64 facing the drum back side 72 has the largest inner diameter. The annular component 66 facing the collection chamber 23 has the smallest inner diameter.

The throttle device bush 63, which is fixedly connected to the pump shaft 5 comprises two disk-shaped bush members 631 and 632 of different outer diameter. The bush member 631 has a larger outer diameter and is arranged such, that it is surrounded by the annular component 64 of the stationary throttle part 61. The bush member 632 has a smaller outer diameter and is arranged such, that it is surrounded by the annular component 65 of the stationary throttle part 61.

Preferably, the annular components 64, 65 and 66 of the stationary throttle part 61 and the bush member 631, 632 of the throttle device bush 63 are dimensioned in such a manner that the extension of the throttle gap 62 in the radial direction is essentially the same between the pump shaft 5 and the annular component 66 as between the bush member 632 and the annular component 65 and as between the bush member 631 and the annular component 64.

The stepwise decreasing diameter of the throttle gap 62 generates a pumping effect which counteracts and therewith reduces the leakage flow of the process fluid.

Figure 5:
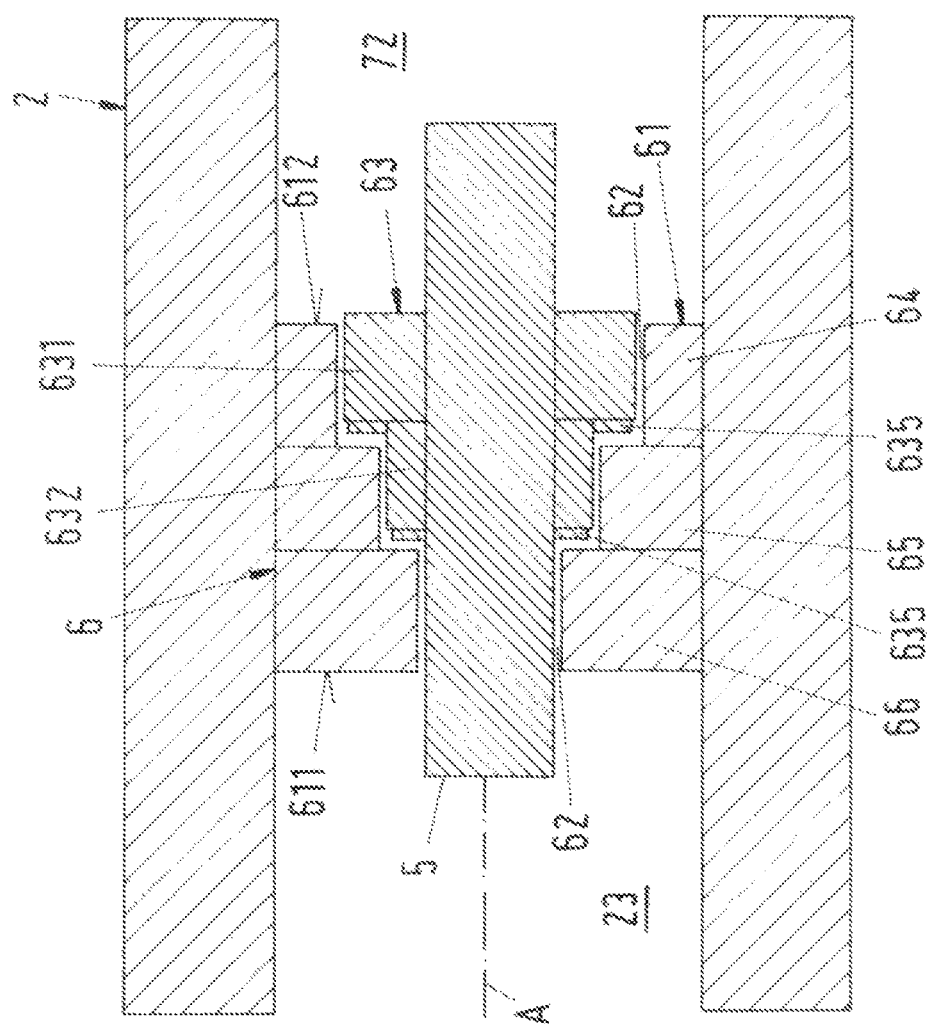
FIG. 5 is a schematic cross-sectional view of a second variant for the throttle device.

FIG. 5 shows a schematic cross-sectional view of a second variant for the throttle device 6. The second variant can be used for all embodiments of the process fluid lubricated pump 1.

The second variant of the throttle device 6 is similar to the first variant, however the second variant comprises a plurality of pumping vanes 635, wherein the pumping vanes 635 are arranged on the axial faces of the bush members 631, 632 facing the collection chamber 23. During operation of the pump 1 the pumping vanes 635 enhance the pumping effect which reduces the leakage through the throttle gap 62.

What is claimed:

1. A process fluid lubricated pump for conveying a process fluid, comprising:
   a pump housing with an inlet configured to receive the process fluid having a suction pressure, and an outlet configured to discharge the process fluid having a discharge pressure;
   a pump shaft extending from a drive end to a non-drive end of the pump shaft and configured to rotate about an axial direction, the drive end of the pump shaft arranged outside the pump housing;
   a hydraulic unit with a plurality of impellers fixedly mounted on the pump shaft;
   a collection chamber configured to be at ambient pressure and to collect leaking process fluid, the collection chamber comprising a shaft exit, through which the pump shaft passes from the inside to the outside of the pump housing, and a fluid exit configured to discharge the process fluid from the collection chamber,
   the pump being a seal-less pump without a mechanical seal, and a throttle device arranged with respect to the axial direction between the hydraulic unit and the collection chamber, the throttle device comprising a stationary throttle part having a first axial face and a second axial face delimiting the stationary throttle part with respect to the axial direction, the first axial face facing the collection chamber, and the throttle device comprising a throttle gap surrounding the pump shaft and extending from the first axial face to the second axial face to enable a leakage of the process fluid along the pump shaft into the collection chamber.

2. The pump in accordance with claim 1, wherein a balance drum is fixedly connected to the pump shaft between the hydraulic unit and the throttle device, the balance drum defining a drum front side facing the hydraulic unit and a drum back side, a relief passage is disposed between the balance drum and a first stationary part configured to be stationary with respect to the pump housing, the relief passage extending from the drum front side to the drum back side, and a balance line is configured to connect the drum back side to a location where essentially the suction pressure prevails.

3. The pump in accordance with claim 1, wherein the throttle device comprises a throttle seal bush, the throttle seal bush is fixedly connected to the pump shaft such that the throttle gap is arranged between the throttle seal bush and the stationary throttle part.

4. The pump in accordance with claim 1, wherein the plurality of impellers comprises a first set of impellers and a second set of impellers, the first set of impellers and the second set of impellers are arranged in a back-to-back arrangement, so that an axial thrust generated by the first set of impellers is directed opposite to an axial thrust generated by the second set of impellers.

5. The pump in accordance with claim 4, comprising a center bush, which is fixedly connected to the pump shaft between the first set of impellers and the second set of impellers, a balancing passage is disposed between the center bush and a second stationary part configured to be stationary with respect to the pump housing.

6. The pump in accordance with claim 1, further comprising an axial bearing to support the pump shaft with respect to the axial direction, the axial bearing being a process fluid lubricated hydrodynamic bearing or an active magnetic bearing.

7. The pump in accordance with claim 1, further comprising an axial bearing to support the pump shaft with respect to the axial direction, the axial bearing is an active magnetic bearing, and the axial bearing is arranged in the collection chamber.

8. The pump in accordance with claim 1, further comprising at least one radial bearing to support the pump shaft with respect to a radial direction perpendicular to the axial direction, the at least one radial bearing is a process fluid lubricated hydrodynamic bearing.

9. The pump in accordance with claim 1 further comprising a hydrostatic support device to provide a radial support to the pump shaft, the hydrostatic support device is configured to provide the support by a Lomakin effect.

10. The pump in accordance with claim 9, wherein the pump is configured without a hydrodynamic radial bearing, and the hydrostatic support device comprises a first throttle bush fixedly connected to the pump shaft between the hydraulic unit and the non-drive end of the pump shaft or at the non-drive end, the first throttle bush defining a first throttle front side facing the hydraulic unit and a first throttle back side, a first throttle passage is disposed between the first throttle bush and a first stationary throttle part configured to be stationary with respect to the pump housing, the first throttle passage extending from the first throttle front side to the first throttle back side, and a supply line is configured to supply pressurized process fluid to the first throttle back side.

11. The pump in accordance with claim 10, wherein a second throttle bush is fixedly connected to the pump shaft between the first throttle bush and the non-drive end of the pump shaft or at the non-drive end, the second throttle bush defining a second throttle back side different from the first throttle back side, a second throttle passage is disposed between the second throttle bush and a second stationary throttle part configured to be stationary with respect to the pump housing, the second throttle passage extending from the first throttle back side to the second throttle back side.

12. The pump in accordance with claim 1, configured as a horizontal pump with the pump shaft extending perpendicular to the direction of gravity.

13. A pump system for conveying the process fluid, comprising:
   the process fluid lubricated pump according to claim 1; and
   a drive unit configured to drive the pump shaft, the drive unit comprising a drive shaft and an electric motor to rotate the drive shaft, and the drive shaft is connected to the drive end of the pump shaft.

14. The pump system in accordance with claim 13, wherein the electric motor is a direct drive motor.

15. The pump system in accordance with claim 13, wherein the electric motor includes active magnetic bearings to support the drive shaft.

* * * * *